(12) United States Patent
Hovell et al.

(10) Patent No.: US 8,046,452 B2
(45) Date of Patent: Oct. 25, 2011

(54) INTER-NETWORK ADDRESS TRANSLATOR THAT IS SEPARATELY ADDRESSABLE FROM ADDRESS ALIAS ASSIGNMENT PROCESS

(75) Inventors: Peter Hovell, Woodbridge (GB); John R King, Woodbridge (GB)

(73) Assignee: British Telecommunications public limited company, London, England ( * ) Notice: Subject to any disclaimer, the term of this patent is extended or adjusted under 35 U.S.C. 154(b) by 2131 days.

(21) Appl. No.: 10/468,780

(22) PCT Filed: Mar. 5, 2002

(86) PCT No.: PCT/GB02/00970
§ 371 (c)(1),
(2), (4) Date: Aug. 21, 2003

(87) PCT Pub. No.: WO02/073933
PCT Pub. Date: Sep. 19, 2002

(65) Prior Publication Data
US 2004/0093434 A1    May 13, 2004

(30) Foreign Application Priority Data
Mar. 8, 2001 (EP) .................................... 01302109

(51) Int. Cl.
*G06F 15/16* (2006.01)
*G06F 15/173* (2006.01)
(52) U.S. Cl. ......... 709/224; 709/201; 709/245; 709/246
(58) Field of Classification Search .................. 709/249, 709/201, 245–246
See application file for complete search history.

(56) References Cited

U.S. PATENT DOCUMENTS
5,802,285 A    9/1998    Hirviniemi
(Continued)

FOREIGN PATENT DOCUMENTS
EP    0840482 A1    5/1998
(Continued)

OTHER PUBLICATIONS
Tsirtsis et al. "RFC 2766: Network Address Translation—Protocol Translation (NAT-PT)" Feb. 2000.*
(Continued)

*Primary Examiner* — Joshua Joo
(74) *Attorney, Agent, or Firm* — Nixon & Vanderhye P.C.

(57) ABSTRACT

Communication between a network device in a first network and a network device in a second network is provided, where the first network operates in accordance with a first communication protocol and the second network operates in accordance with a second communication protocol. An alias is assigned to a target network device in the first network, the alias being compatible with the communication protocol of the second network The assigned alias is translated to an address for a target network device, the translated address being compatible with the communication protocol of the first network. Apparatus, for assigning the alias and for translating it are separately addressable in one or both of the networks, and the assigned alias corresponds to an address of the translating apparatus, such that, when a network device in the second network sends one or more communication(s) using an address including the assigned alias, each communication is routed to the translator, whereupon the translator translates the alias into the address of the target network device in the first network and sends the communication(s) into the first network.

21 Claims, 11 Drawing Sheets

U.S. PATENT DOCUMENTS

| | | | |
|---|---|---|---|
| 6,038,233 A | 3/2000 | Hamamoto et al. | |
| 6,172,986 B1 | 1/2001 | Watanuki et al. | |
| 6,427,174 B1* | 7/2002 | Sitaraman et al. | 709/245 |
| 6,490,289 B1* | 12/2002 | Zhang et al. | 370/401 |
| 6,690,669 B1 | 2/2004 | Tsuchiya et al. | |
| 6,708,219 B1 | 3/2004 | Borella et al. | |
| 6,745,243 B2* | 6/2004 | Squire et al. | 709/227 |
| 6,781,991 B1 | 8/2004 | Anderlind | |
| 6,892,245 B1* | 5/2005 | Crump et al. | 709/245 |
| 7,006,431 B1* | 2/2006 | Kanekar et al. | 370/217 |
| 7,088,726 B1* | 8/2006 | Hamamoto et al. | 370/401 |
| 7,116,681 B1 | 10/2006 | Hovell et al. | |
| 7,188,191 B1* | 3/2007 | Hovell et al. | 709/245 |
| 2002/0093960 A1* | 7/2002 | Tsuchiya et al. | 370/390 |
| 2005/0010754 A1* | 1/2005 | Brendel | 713/153 |
| 2007/0133600 A1* | 6/2007 | Tsuchiya et al. | 370/466 |

FOREIGN PATENT DOCUMENTS

| | | | |
|---|---|---|---|
| WO | WO 01/06734 | * | 1/2001 |
| WO | WO 01/06734 A2 | | 1/2001 |

OTHER PUBLICATIONS

Tsirtsis et al, RFC2766: Network Address Translation—Protocol Translation (NAT-PT) Request for Comment Feb. 2000.

Internet Document—IETF Introduction to IPV6, www.ietf.org/internet-drafts/draft-ietf-ngtrans-introduction-to-ipv6-transition-05.txt.

Internet Document Various Approaches to IPV4-IPV6, http://www.6bone.net/ngtrans/ngtrans_project-status.html.

Laborde, "Understanding and Implementing Effective VPNS" Computer Technology Review, US, Westworld Production Co., Los Angeles, vol. 18, No. 2, Feb. 1, 1998, pp. 12, 14, 16.

Lee et al, "The Next Generation of The Internet: Aspects of the Internet Protocol Version 6", IEEE Network, IEEE Inc. New York, US, vol. 12, No. 1, 1998, pp. 28-33, XP000739805.

R. Callon, D. Haskin, "Routing Aspects of IPv6 Transition", RFC 2185, http://rfc.sunsite.dk/rfc/rfc2185.html, Sep. 1997.

A. Conta, S. Deering, "Generic Packet Tunneling in IPv6 Specification", RFC 2473, www.faqs.org/rfcs/rfc2473.html, Dec. 1998.

\* cited by examiner

One – One
(1:1)

2:1

3:1

INTER-NETWORK ADDRESS TRANSLATOR THAT IS SEPARATELY ADDRESSABLE FROM ADDRESS ALIAS ASSIGNMENT PROCESS

This application is the U.S. national phase of international application PCT/GB02/00970 filed 5 Mar. 2002 which designated the U.S.

RELATED APPLICATIONS

This application is related to commonly assigned copending application Ser. Nos. 10/069,295 filed Feb. 25, 2002 and 10/069,359 filed Feb. 25, 2002.

BACKGROUND

1. Technical Field

This invention relates to an address translator, and is suitable particularly, but not exclusively, for address translation between different networks.

2. Related Art

Currently all commercial Internet Protocol (IP) networks are IPv4 networks; however, at some point in the future, commercial IP networks will be IPv6 networks. In the meantime there will be a transitory period, during which commercial IP networks will comprise a mixture of IPv4 and IPv6 networks. IPv6 is a totally different protocol to IPv4 and is fundamentally incompatible with IPv4. Therefore, during the transitory period at least, network devices and/or networks will require mechanisms to enable a node and/or host in an IPv4 network, having an IPv4 address, to communicate with a node and/or host in an IPv6 network, having an IPv6 address.

Several migration mechanisms have been developed; see for example a document published in November 2000 by the Internet Engineering Task Force (IETF) and available from the IETF entitled "An Overview of the Introduction of IPv6 in the Internet", authors: W. Biemolt et al, IETF Status: Draft working towards Informational RFC. Essentially these methods can be categorized as either "aggressive, short term" methods or "conservative, long term" methods.

A problem with at least some of known migration methods is that they have been designed and operated in a test environment, and have not been subjected to the volume of traffic experienced in commercial IP networks. There has therefore been little work carried out on designing migration methods that are commercially scalable and robust. This could be a serious problem, given that the transition between IPv4 and IPv6 is expected to be long, and the volume of IP traffic is continually increasing.

In the following description, the terms "host", "network device", "pool of addresses" and "node" are used and are defined as follows:

"node": any equipment that is attached to a network, including routers, switches, repeaters, hubs, clients, servers; the terms "node", "device" and "network device" are used interchangeably;

"host": equipment for processing applications, which equipment could be either server or client, and may also include a firewall machine; and "pool of addresses": a group of addresses available for a purpose; the addresses could include IPv4 addresses that are globally unique, or addresses that are private within a network, e.g. a VLAN.

According to a first aspect of the invention there is provided apparatus for providing communication between a network device in a first network and a network device in a second network, where the first network operates in accordance with a first communication protocol and the second network operates in accordance with a second communication protocol. The apparatus comprises (i) first means for assigning an alias to a target network device in the first network, the alias being compatible with the communication protocol of the second network;

(ii) second means for translating said assigned alias to an address for the target network device, said translated address being compatible with the communication protocol of the first network, wherein the first means and the second means are separately addressable in one or both of said networks, and said assigned alias corresponds to an address of the second means, such that, when a network device in the second network sends one or more communication(s) using an address comprising the assigned alias, the or each communication is routed to the second means, whereupon the second means translates the alias into the address of the target network device in the first network and sends the communication(s) into the first network.

Particularly advantageous embodiments of the invention are applied between IPv4 and IPv6 networks, so that the first network is a IPv4 network and the second network is a IPv6 network.

Preferably the alias comprises a network address, and when the communication is being sent into an IPv6 network, the network address includes an identifier representative of the second means.

Conveniently the second means comprises a plurality of further devices. Thus, upon assignment of alias to the target network device, the first means effectively causes subsequent communications to occur via one of a plurality of further devices. Having a plurality of devices advantageously introduces resilience, scalability and efficient management of network loading.

Advantageously the or each further device has access to one or more groups of aliases, and each group can be stored in a store. Alternatively, two or more groups can be stored in a store.

Preferably embodiments include selecting means for selecting one of the plurality of further devices in accordance with predetermined criteria, such as device characteristics. Advantageously the selecting means is operable to monitor the device characteristics, so that selection of a device is based on current device performance. Monitored device characteristics include at least one of operational status of device, loading on device, and/or aliases available to the device.

In preferred embodiments, the selecting means is in operative association with the first means, so that the first means is operable to retrieve an alias available to the further device, which retrieved alias is the assigned alias.

Conveniently embodiments include a mapping store for storing mappings between the assigned alias and the network device assigned to the alias. The mapping store can be managed by the first means, a database, or by the further device. The selection of manager of the mapping stored is typically subject to criteria such as network traffic, ownership of network devices and transmission paths.

According to a second aspect of the present invention there is provided a method of providing communication between a network device in a first network and a network device in a second network corresponding to the apparatus described above.

BRIEF DESCRIPTION OF THE DRAWINGS

Further aspects, features and advantages of the present invention will be apparent from the following description of preferred embodiments of the invention, which refer to the accompanying drawings, in which.

DETAILED DESCRIPTION OF EXEMPLARY EMBODIMENTS

Embodiments of the invention are concerned with issues relating to migration from IPv4 to IPv6 networks. Specifically, embodiments of the invention are concerned with scalability aspects of migration methods; as stated above, almost all of the IPv6 networks currently in operation are "test" networks and are not subject to the volume of IP traffic passing through commercial IP networks. Thus the performance of the migration methods in a commercial environment may be unacceptably low.

One embodiment of the invention is concerned with the Network Address Translator—Protocol Translator (NAT-PT) method, which is documented by the IETF in Request for Comments" RFC2766, available from the IETF. NAT-PT is a mechanism that translates both the IP header and the IP addresses from IPv6 to IPv4, and vice versa. With NAT-PT explicit mappings are maintained between arbitrary IPv4 and IPv6 addresses, so that, when converting addresses, NAT-PT consults a pre-configured table to determine the corresponding address to use with the other protocol. As documented in the Introduction section of RFC2766, with NAT-PT, packets that are part of a session between an IPv4 host and an IPv6 host MUST go via the same NAT-PT entity, because address mappings are kept within that NAT-PT and are not shared. This is a consequence of the translation mechanism of NAT-PT: NAT-PT is a stateful translation process, meaning that there is specific information that must be retained in order for each individual session to be translated.

Thus address translation is performed by aliasing an IPv6 address with an IPv4 address in much the same way as is done with a conventional Network Address Translation (NAT) device. Some NAT-PT implementations include a DNS Application Level Gateway (DNS_ALG), which translates DNS requests and responses.

Figure 1:
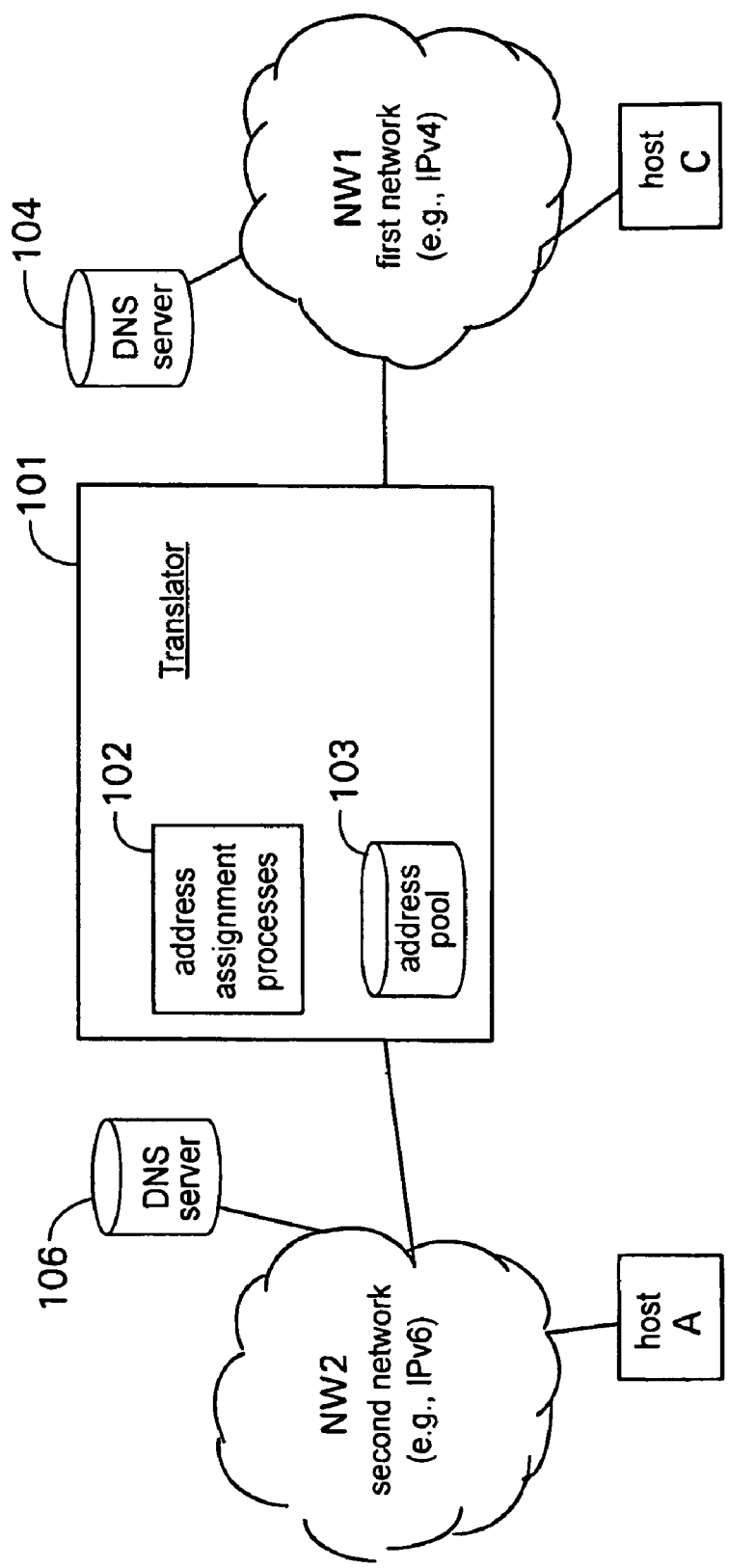
FIG. 1 is a schematic diagram showing a first and a second network and known means facilitating communicating between the first and second networks.

FIG. 1 shows a conventional implementation of NAT-PT in operation between a first network NW1, which may be an IPv4 network and a second network NW2, which may be an IPv6 network. The implementation includes a single translator 101, which comprises processes 102 that manage assignment of IPv6/v4 addresses. Such processes 102 include the DNS application level gateway. In addition the translator 101 has access to a pool 103 of IPv4 addresses, which is used for assignment to IPv6 nodes. FIG. 1 additionally shows two DNS servers 104, 106, a first 104 of which stores IPv4 name to address mappings in the form of "A" records, and a second 106 of which stores IPv6 name to address mappings in the form of "AAAA" records.

The translator 101 is typically located on a border router, referred to as an ingress interface with respect to the IPv6 network NW2.

Figure 2:
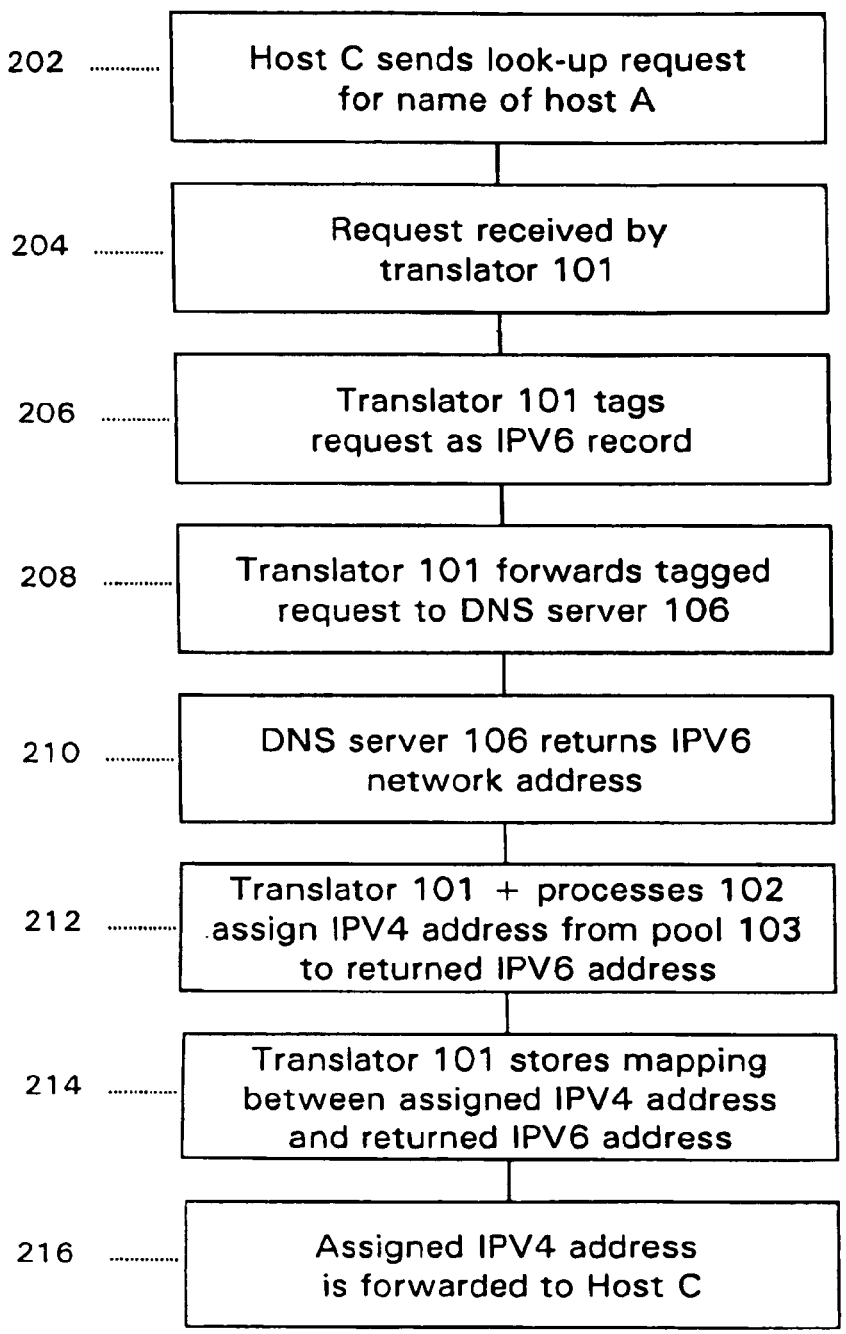
FIG. 2 is a flow diagram showing steps carried out by a known address translation process when setting up communications between hosts located in the first and second networks of FIG. 1.

Conventional operation of this known NAT-PT implementation is shown in FIG. 2. In a typical scenario, host C in the IPv4 network at 202 sends a name lookup request for host A in the IPv6 network. This lookup request is termed an "A" type DNS request. This request is received at 204 by the translator 101, which, at 206, tags the request as an IPv6 record request, so that the request becomes an "AAAA" type DNS request, and, at 208, forwards the tagged request to the DNS server 106.

The DNS server 106 replies at 210, returning an IPv6 network address to the translator 101, which, in co-operation with the processes 102, assigns at 212 an IPv4 address from the pool of addresses to the returned IPv6 address. The translator 101 at 214 stores the mapping between the assigned IPv4 address and the returned IPv6 address, and at 216 forwards the assigned IPv4 address to the requesting host C.

Figure 3:
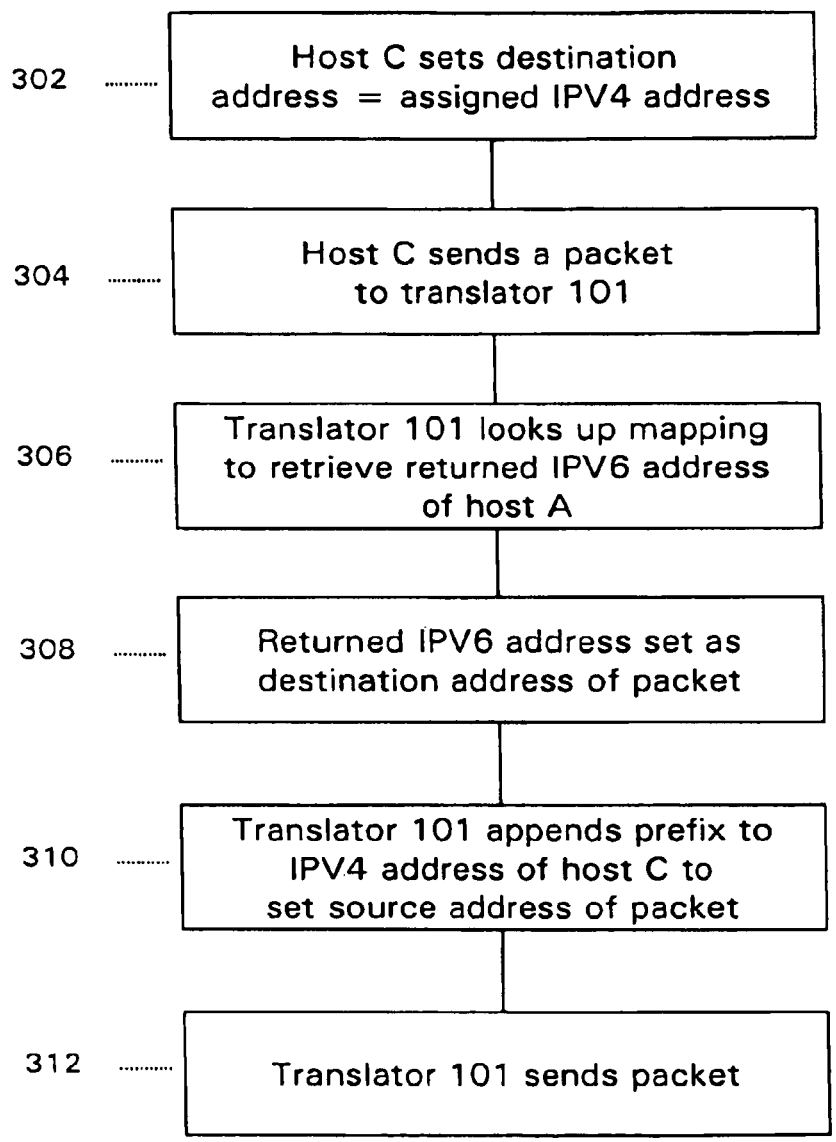
FIG. 3 is a flow diagram showing steps carried out by a known address translation process when data is sent from a host located in the first network to a host located in the second network of FIG. 1.

In subsequent communications between hosts C and A, and as shown in FIG. 3, host C at 302 sets the destination address to be the assigned IPv4 address for outgoing packets, and at 304 sends the packets to the assigned IPv4 address of Host A, and conventional IP routing ensures that the packet routes to the translator 101. The translator 101 then looks up up at 306 the mapping between assigned IPv4 address and IPv6 address to retrieve the IPv6 address of host A, and at 308 makes this the destination address of the packet.

For the packets to be routed from the translator 101 to host A, the translator 101 has to modify the source address of the packet, which is the IPv4 address of node C, into IPv6 format. This involves expanding at 310 the IPv4 address of host C with a prefix that is representative of the translator 101. As is well known, an IPv4 address is 32 bits long, whereas an IPv6 address is 128 bits long. As stated above, an IPv6 host cannot interpret an IPv4 address, and vice-versa—because of the differences in address length. Thus when an IPv4 packet arrives at the translator 101 a 96 bit prefix, which is indicative of the translator 101, is added to the source address of the packet (32 bits) to make an IPv6 address (128 bits). Packets sent to this IPv6 address will then be routed to the translator 101. [For example an IPv4 source address 10.10.10.10 arriving at the translator 101 could be given the prefix 2001:618:1:2:: so that the source IPv4 host has the following address in the IPv6 world: 2001:618:1:2::10.10.10.10. An IPv6 packet sent to this address would go to translator 101 because the prefix 2001:628:1:2:: routes to the translator 101.]

The translator 101 then at 312 sends the packet, using the expanded IPv6 address. All subsequent communications between host A and host C can make use of the mappings stored in the translator 101.

Communications initiated by host A, in the IPv6 network, involve similar address assignment; for a working example the reader is referred to the RFC detailed above.

From the above it can be seen that, once IPv6 addresses have been assigned, the translator 101 performs translation of packets as they pass between hosts (C) in the IPv4 network and hosts (A) in the IPv6 network, thus acting as a medium for all communication between said hosts A, C. A problem with this configuration is that centralized address assignment and communications processing could present scalability problems when IPv6 networks become mainstream.

The essence of exemplary embodiments of the invention is that the functionality of initial address assignment (FIG. 2) is separated from subsequent events that make use of the assigned addresses (e.g. packet encapsulation as packets pass from host A to host C, as shown in FIG. 3). This is a particularly unexpected development of the NAT-PT method described in RFC2766: the RFC mandates that, because NAT-PT is stateful, address assignment and allocation should be carried out on one and the same device—i.e. that they are inseparable.

Figure 4:
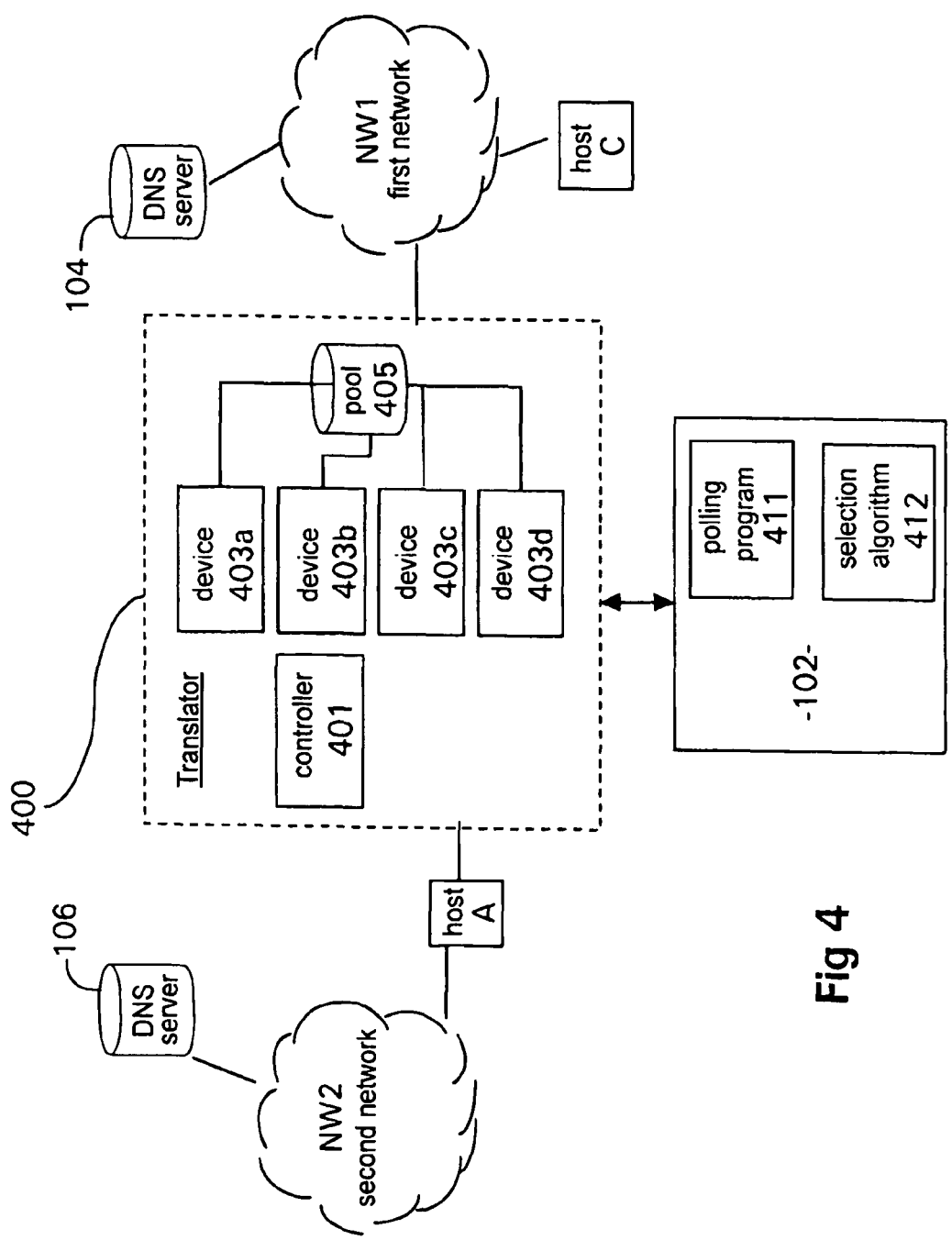
FIG. 4 is a schematic diagram showing an address translator according to an embodiment of the present invention.

In one embodiment of the invention, and as shown in FIG. 4, the translator 400 essentially comprises two components: a controller 401 and a plurality of devices 403a, 403b . . . 403n (hereinafter collectively referred to as 403$_i$). Requests to communicate with hosts in the IPv"other" network are received by the controller 401, which polls the devices 403$_i$ in order to identify one that has capacity to service the request. A device so identified thereafter deals with all subsequent communication between hosts in IPv6 and IPv4, and the subsequent communication is therefore independent of the controller operations. The configuration and functionality of these components is described in more detail below.

Thus in exemplary embodiments of the invention, address assignment events are separated from subsequent communication events between hosts in IPv4 and IPv6 networks (e.g. translating packets using the assigned addresses). In addition, the controller 401 can select from a plurality of devices for address assignment.

There are several advantages associated with the exemplary embodiments:

Firstly devices are passive in the address assignment phase (FIG. 2), which means that if a device fails it won't affect servicing of new requests (the controller 401 can select another device, for example).

Secondly the translator 400 is scalable, as devices can easily be added in accordance with demand.

Thirdly, communication between devices in IPv4 and IPv6 networks can continue independently of address assignment, so that (i) failure of controller 401 due to address assignment problems does not affect communications that have already been established between hosts in IPv4 and IPv6 networks; (ii) network problems corresponding to communications between IPv4 and IPv6 hosts do not affect the controller; and (iii) the controller does not have to account for, or schedule, subsequent communication events.

Fourthly, as IPv6 begins to outgrow IPv4 then devices can be de-commissioned as required, again without major translation service disruption.

Fifthly, for an IP network provider to deploy an IPv6 network with "IPv6-only" services, it will be necessary to provide some kind of translation facility so that both IPv4 network users can access the IPv6 services and IPv6 users can access existing IPv4 based services. The embodiments presented herein allow a commercial service provider the ability to dynamically scale the address translation service according to the dimensions of the IPv6 network.

Referring back to FIG. 4, the configuration of the translator 400 will now be described in more detail.

The controller 401 receives DNS requests initiated by hosts in either the IPv4 or the IPv6 networks, and manages DNS lookups, in the manner described above, in respect of the requests. Having received a returned IPvn address from a respective DNS server 104, 106, the controller 401 then identifies a device 403$_i$ that will mediate for subsequent communications between the requesting host (in the example above, host C) and the destination host (in the example above, host A). Each device has a globally routable prefix (i.e. a prefix that is appended to destination addresses of packets destined for the device), which, when appended to an IPv4 address, enables packets to reach the device (as described above).

In one embodiment identification of a device 403$_i$ comprises determining whether the device 403$_i$ is up and running. In addition the controller 401 identifies whether there are any free addresses available to the device 403$_i$, and the current loading on, or the number of communications that are currently being handled by, a device. Conveniently the controller 401 may run a program 411, which polls each device 403$_i$ at predetermined intervals to determine current loading, operational status and IP addresses accessible to that device. The program 411 gathers the loading and address availability data from the devices 403$_i$, and stores it, for example as a list in memory. The controller 401 may run the program 411 at predetermined intervals, for example every second, or as frequently as required to capture changes to the devices 403$_i$.

The controller 401 may also run selection algorithms for selecting a device 403$_a$ from the list. For example, a typical selection algorithm 412 searches the list for an operational device that has access to at least one free IPv4 address and that has a loading below a predetermined threshold. If more than one device satisfies these criteria, then the device with lowest loading is selected. Many variations on this example are possible, and would be apparent to the skilled person.

In one embodiment each device 403; may be a conventional router, so that the controller 401 can derive the loading on a device 403$_a$ by issuing Simple Network Management Protocol (SNMP) messages to a Management Information Base (MIB) that is maintained on the router. SNMP is part of the known TCP/IP network software, and MIB, or Management Information Base, is a standard specifying the data items that a host, router or switch must keep, together with the operations allowed on each. SNMP is the protocol that enables information to be extracted from a MIB, and is known to those skilled in the art. For further details see Request for Comments (RFC) 2037/2737, Entity MIB, McCloghnie et al 1996/1999, published by the Internet Engineering Task Force (IETF) or Understanding SNMP MIBs by David Perkins, Evan McGinnis. Prentice Hall, 1$^{st}$ edition (Dec. 3, 1996).

In one of the embodiments each of the devices $403_i$ has access to a pool 405 of IPv4 addresses, and the availability, to any single device $403_a$ of IP addresses, is recorded on a respective device 403. The controller 405 could therefore determine address availability per device 403 by reviewing the record of address availability thereon. The skilled person would realize that such a record does not need to be stored on the devices themselves, but could be held centrally, e.g. in a database.

Figure 5A:
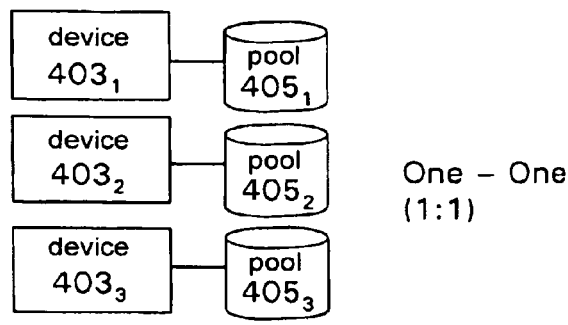
FIG. 5a is a schematic diagram showing a configuration of address pool comprising part of the address translator shown in FIG. 4.
Figure 5B:
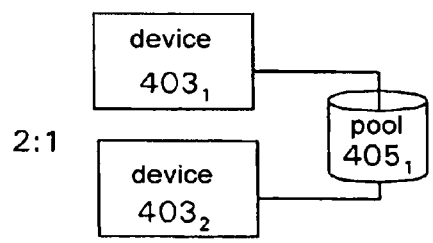
FIG. 5b is a schematic diagram showing an alternative configuration of address pool comprising part of the address translator shown in FIG. 4.
Figure 5C:
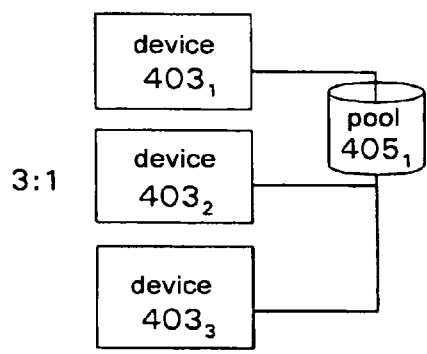
FIG. 5c is a schematic diagram showing yet another possible configuration of address pool comprising part of the address translator shown in FIG. 4.

The pool 405 can either be a central pool, as is shown in FIG. 4, and accessible by all of the devices $403_i$, or can comprise a plurality of pools, each accessible to a limited number of the devices $403_i$. For example, there may be one pool 405 per device $403_i$, as shown in FIG. 5a, or there may be one pool 405 per n devices $403_i$, as shown in FIGS. 5b and 5c.

Essentially the controller 401 may comprise one or more programs running on a processor, such as a conventional client or server computer. Alternatively the controller 401 could run on a router. In either configuration, the controller 401 could connect to each of the devices $403_i$ via dedicated links or via the Internet; if security were a consideration, dedicated links would be more suitable. As an alternative, a security protocol, such as IPsec, which is a mandatory part of IPv6, could be used for communications between controller 401 and devices $403_i$. The programs can include socket processes that listen for incoming DNS lookup requests and listen for requests from devices $403_i$.

In preferred embodiments the controller 401 processes incoming requests on a FIFO (First-in, First-out) basis—i.e. the controller 401 implements a queuing discipline in which entities (here requests, incoming packets) are stored in a queue (or in the stack) and are serviced in the same order in which they arrive. As an alternative, the controller 401 could process requests in accordance with LIFO (last-in, first-out), where the most recent request is handled next and the oldest request doesn't get handled until it is the only remaining request on the queue (or in the stack).

Other scheduling policies are possible, e.g. when the controller 401 is subject to constraints; a suitable scheduling policy could utilise some sort of heuristic method (or combination of heuristic methods) in an attempt to schedule the requests so as to satisfy the constraint criteria. As a further alternative, the scheduling policy could make use of Quality of Service information included in IPv6 headers: certain bits in the IP header indicate the priority of the request, and the controller 401 could include means for examining these bits (not shown). The controller 401 could have a plurality of queues, each corresponding to a different priority level, which the controller 401 services on, e.g. a sequential basis.

Figure 6:
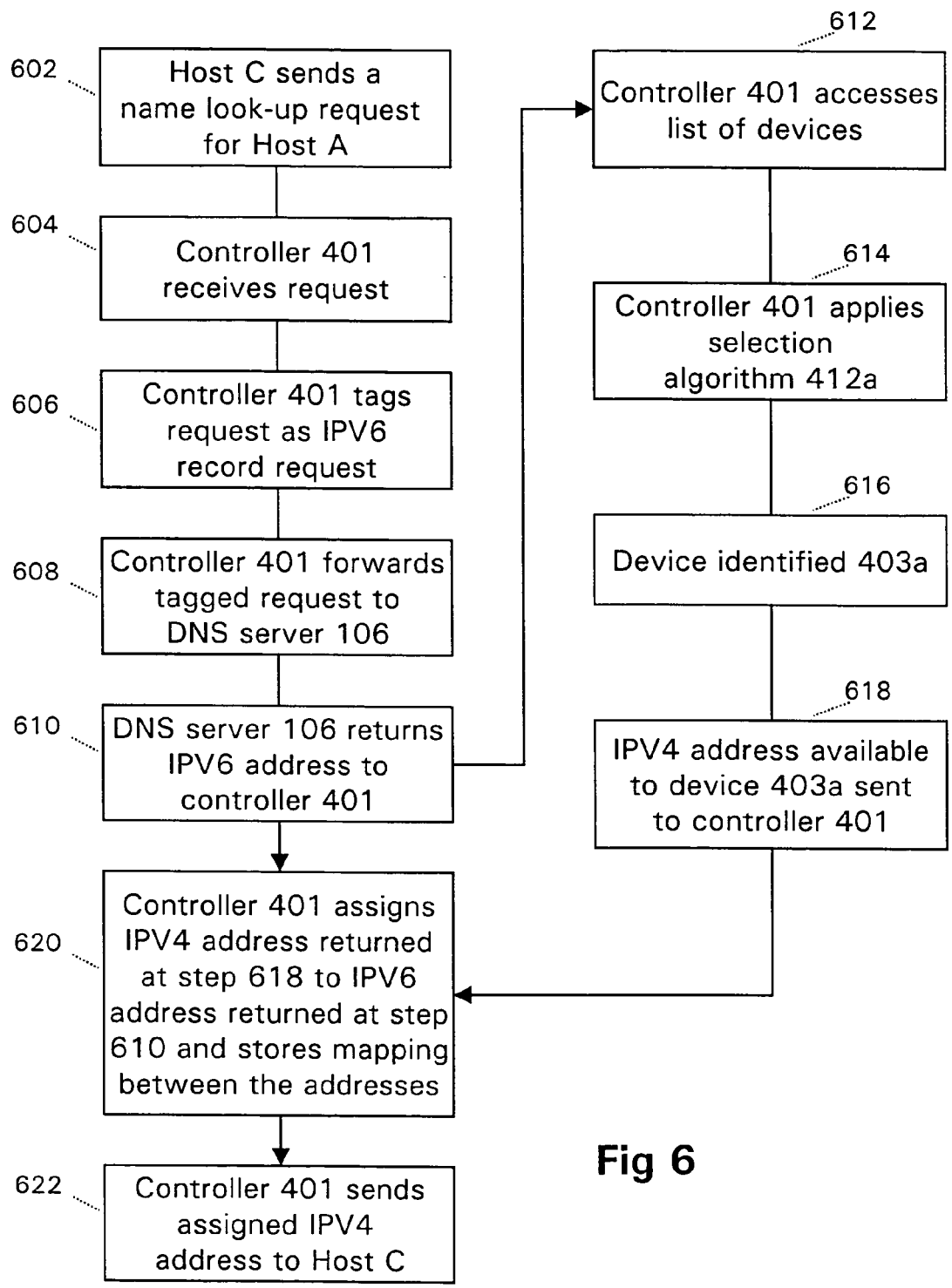
FIG. 6 is a flow diagram showing steps carried out by an embodiment of the address translator shown in FIG. 4, when setting up communications instigated by a host in the first network.
Figure 7:
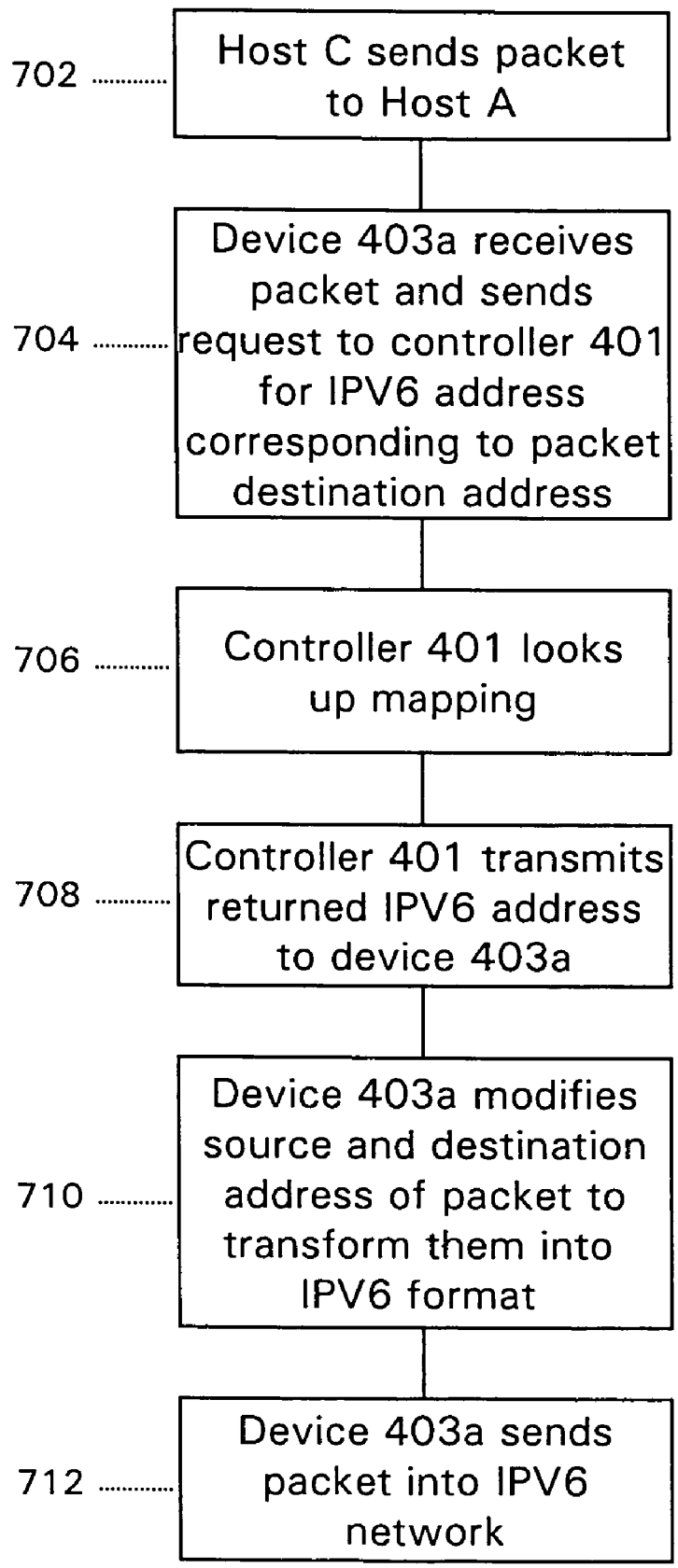
FIG. 7 is a flow diagram showing steps carried out by an embodiment of the address translator shown in FIG. 4, when data is sent from the instigating host of FIG. 6 to a host in the second network.
Figure 8:
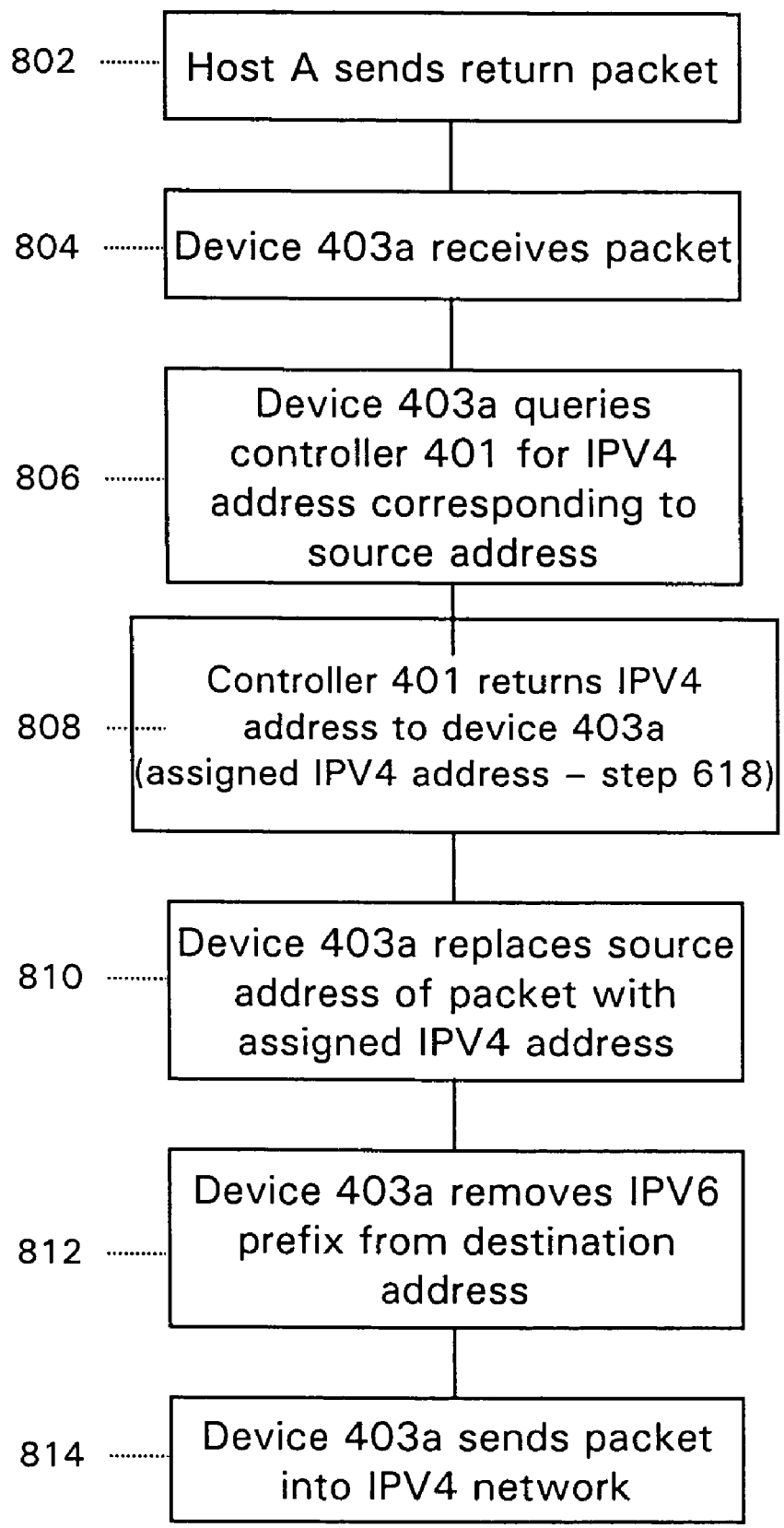
FIG. 8 is a flow diagram showing steps carried out by an embodiment of the address translator shown in FIG. 4, when data is returned from the host in the second network.
Figure 9:
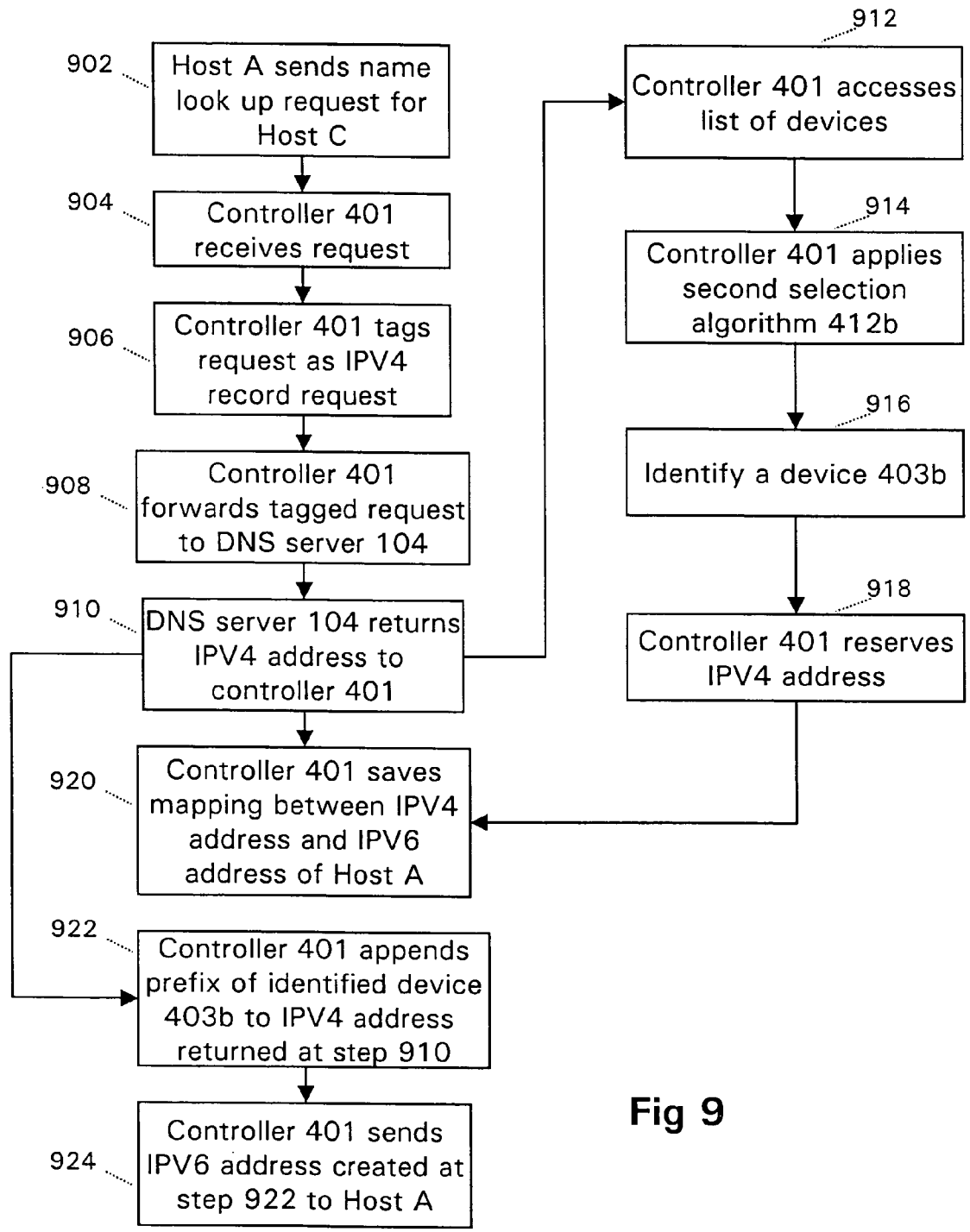
FIG. 9 is a flow diagram showing steps carried out by an embodiment of the address translator shown in FIG. 4, when setting up communications instigated by a host in the second network.
Figure 10:
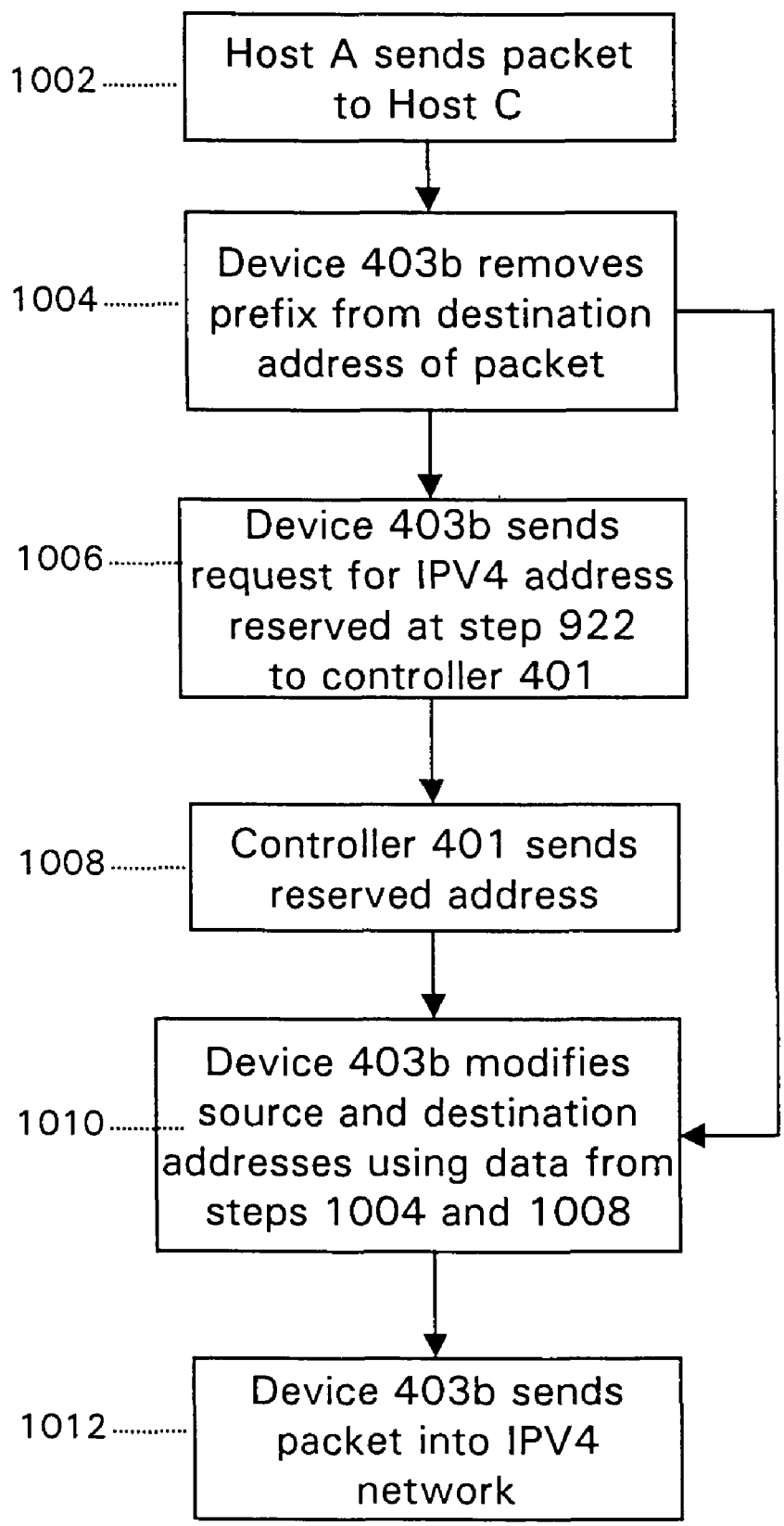
FIG. 10 is a flow diagram showing steps carried out by an embodiment of the address translator shown in FIG. 4, when data is sent from the instigating host of FIG. 9 to a host in the first network.
Figure 11:
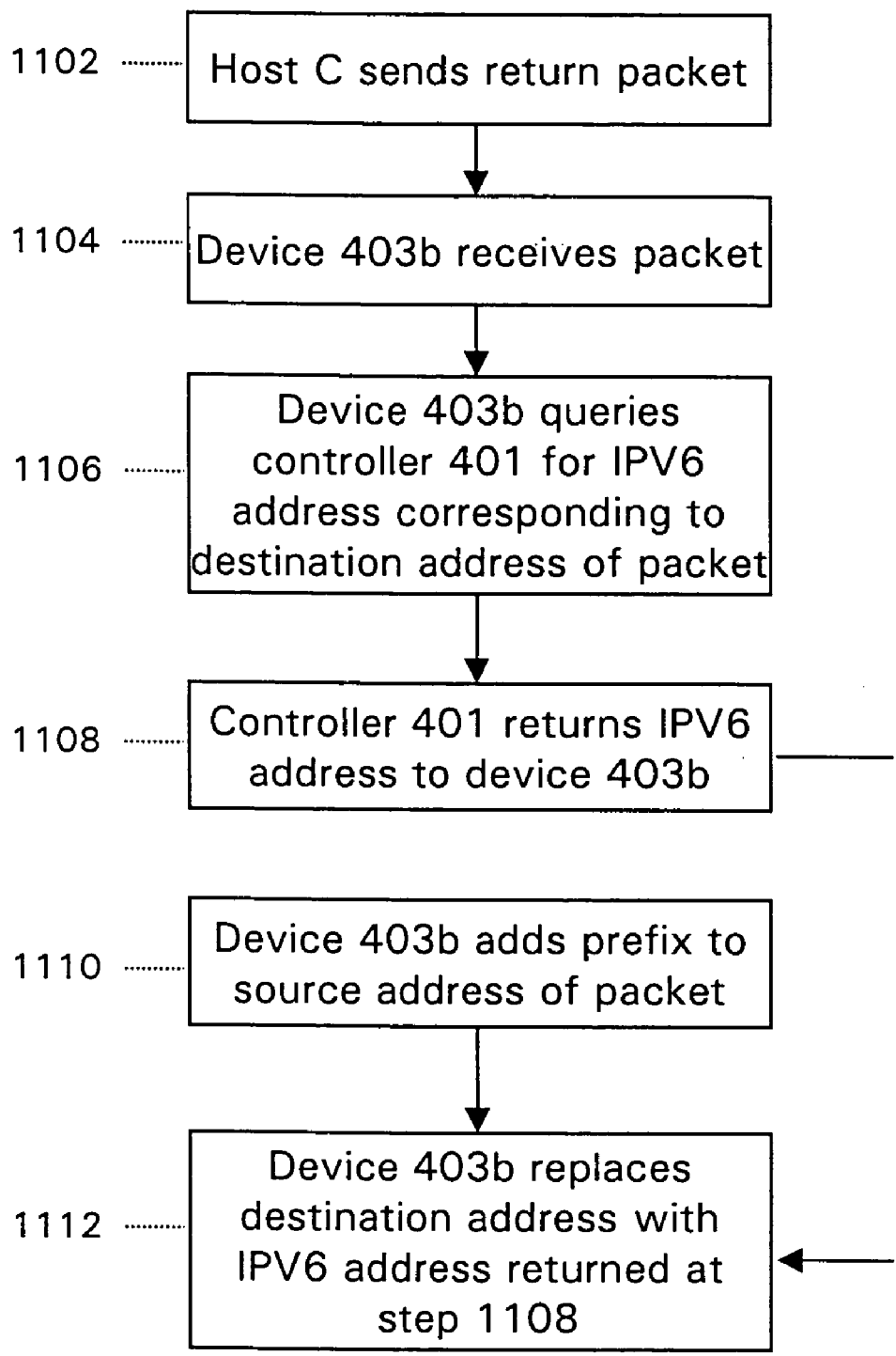
FIG. 11 is a flow diagram showing steps carried out by an embodiment of the address translator shown in FIG. 4, when data is returned from the host in the first network.

A flow chart for the translator 400 managing communications initiated by a host C in an IPv4 network (to communicate with a host A) is shown in FIGS. 6-8, and a flow chart for the translator managing communications initiated by a host A in an IPv6 network (to communicate with a host C) is shown in FIGS. 9-11.

FIGS. 6 and 9 each show a main loop, on the left hand side of the respective flow charts, representing processes carried out in respect of incoming initiating requests. On the right hand side of the respective flow charts there is a sub-loop, which represents processes carried out between the controller 401 and devices $403_i$.

Considering firstly the case shown in FIG. 6, host C in an IPv4 network at 602 sends a name lookup request for host A in the IPv6 network. This request is received at 604 by the controller 401, which at 606 tags the request as an IPv6 record request, by modifying the request to a "AAAA" record request, and at 608 forwards the tagged request to the DNS server 106. The DNS server 106 replies at 610, returning an IPv6 network address to the controller 401.

The controller 401 then tries to identify a device $403_a$ for mediating communications. This process is shown in the loop on the right hand side of FIG. 6 and comprises the following steps: the controller 401 at 612 accesses a list of devices 403; that, for each device $403_i$, details loading on the device and IP addresses accessible to that device. Such a list can be stored in memory, as described above. The controller 401 then at 614 applies a selection algorithm 412, such as the one described above, to the list in order to identify a device for the current request. Once a device $403_a$ has been identified at 616, an IPv4 address available to that device $403_a$ is selected and returned at 618 to the controller 401. (In addition to, or in place of, the automatic polling of devices $403_i$ described above, the process 411 may automatically be invoked each time a device is so identified).

The controller at 620 assigns the IPv4 address returned at step 618 to the IPv6 address returned at step 610 and saves a mapping between the two. The assigned IPv4 address is then sent at 622 to host C. Typically, a number of IP addresses that are available to a device will be pre-assigned to an interface of that device (in a manner known to those skilled in the art), so that a single interface effectively has a plurality 30 of IP addresses. Thus when a packet is sent from host C bearing a destination address of the assigned IPv4 address, the packet will be routed to the corresponding interface of the device $403_a$.

At this point host C has an IPv4 address for host A, which it can use to route packets to host A. FIG. 7 shows the scenario of host C sending at 702 a packet to host A: the packet has a destination address set to the assigned IPv4 address and source address set to the IPv4 address of host C. As the assigned address is routable to the identified device $403_a$ (as described in the paragraph above) the packet will arrive at the device $403_a$, whereupon the device $403_a$ sends at 704 a request to the controller 401 for the IPv6 address corresponding to the destination address of the packet (which is the IPv4 address assigned at step 620). The controller 401 performs at 706 a lookup of its stored mappings and transmits at 708 the returned IPv6 address to the device $403_a$. At this point the device $403_a$ is in receipt of all of the information required to enable it to autonomously mediate further communications between hosts A and host C.

The device $403_a$ then at 710 modifies the source and destination addresses of the packet sent by host C, expanding the source address to include the IPv6 prefix of the device $403_a$ together with the IPv4 address of the host C (as described above), and setting the destination address to the returned IPv6 address. The device $403_a$ then at 712 sends the packet into the IPv6 network for receipt by host A.

Referring to FIG. 8, if host A sends a response to host C, host A at 802 sends one or more packets having as destination address the IPv6 prefix of the device $403_a$ together with the IPv4 address of the host C and as source address its own IPv6 address (which is of course the IPv6 address returned at step 610). The device $403_a$ receives at 804 the, or each packet, and queries 806 the controller 401 for an IPv4 address corresponding to the IPv6 source address of the incoming packet.

The controller 401 returns at 808 the corresponding IPv4 address, which is the assigned IPv4 address (from step 620), to the device $403_a$, whereupon the source address of the or each incoming packet is replaced at 810 with the assigned IPv4 address. In addition the device $403_a$ at 812 modifies the destination address, removing the IPv6 prefix of the device $403_a$ to leave the IPv4 address of host C. Finally the device $403_a$ at 814 sends the, or each packet, into the IPv4 network.

Considering secondly the case shown in FIG. 9, host A in an IPv6 network sends at 902 a name lookup request for host C in the IPv4 network. This request is received at 904 by the controller 401, which at 906 tags the request as an IPv4 record request, by modifying the request to a "A" record request, and at 908 forwards the tagged request to the IPv4 DNS server 104. The DNS server 104 replies at 910, returning an IPv4 network address to the controller 401.

The controller 401 then tries to identify a device $403_b$ for mediating communications. This process is shown in the loop on the right hand side of FIG. 9 and comprises the following steps: the controller 401 at 912 accesses 912 the list of devices described above, and applies at 914 a selection algorithm 412 to the devices on the list in order to identify a device for the current request. Once a device $403_b$ has been identified at 916, the controller 401 reserves at 918 an IPv4 address from the pool 405 accessible to the identified device $403_b$. The controller 401 then saves at 920 a mapping between the reserved IPv4 address and the IPv6 address of host A. Finally the controller 401 appends at 922 a prefix identifier of the identified device $403_b$ (as described above) to the IPv4 address returned at step 910, and at 924 sends this to host A.

At this point the device $403_b$ is in receipt of all of the information required to enable it to autonomously mediate further communications between hosts A and host C.

FIG. 10 shows the scenario of host A at 1002 sending a packet to host C: the packet has a destination address set to the IPv6 address sent at step 924. As this address is globally routable to the identified device $403_b$ (as described above) the packet will arrive at the device $403_b$, whereupon the device $403_b$ at 1004 removes the prefix from the destination address, leaving the IPv4 address of host C.

The device $403_b$ at 1006 sends a request for the IPv4 address reserved at step 922, whereupon the controller 401 at 1008 sends the reserved address. The device $403_b$ at 1010 modifies the source and destination addresses of the packet sent by host A, setting the source address to the IPv4 address of the host C, and setting the destination address to the reserved IPv4 address. The device $403_b$ then at 1012 sends the packet into the IPv4 network for receipt by host C.

Referring to FIG. 11, if host C at 1102 sends a response to host A, such a response may comprise one or more packets having as destination address the reserved IPv4 address and as source address its own IPv4 address. The device $403_b$ at 1104 receives the, or each packet, at 1106 and queries the controller 401 for an IPv6 address corresponding to the destination address of the packet. The controller 401 performs a lookup of its stored mappings and returns at 1108 an IPv6 address, which is the IPv6 address of host A.

The device $403_b$ at 1110 adds its prefix to the source address of the packet (IPv4 address of host C) to form an IPv6 address, as described above, and the destination address of the packet is replaced at 1112 with the IPv6 address returned at step 1108 (i.e. the IPv6 address of originating host A). Finally the device $403_b$ at 1114 sends the packet into the IPv6 network.

Second Embodiment

The second embodiment includes all of the features described in respect of the first embodiment, but instead of the address mappings being stored on the controller 401, the mappings are stored on a remote database, or similar, that is accessible to both the controller 401 and the devices $403_i$. Thus in this embodiment the devices $403_i$ do not have to communicate with the controller 401 at all once the initial address assignment has been established.

Third Embodiment

The third embodiment includes all of the features described in respect of the first embodiment, but the devices $403_a$ cache addresses in memory for a predetermined period. This embodiment would be particularly suitable for the scenario shown in FIGS. 6-11, where a host in an IPv4 network initiates communication, and where an intense period of communication is in progress between hosts A and C. If the device $403_a$ caches mapping information locally, the device $403_a$ does not have to continually request address mapping information from the controller. This therefore keeps communication between A and C wholly independent of the controller 401, minimizes network traffic and allows communications dependent on address translation to progress faster than in the other embodiments.

Fourth Embodiment

The fourth embodiment includes all of the features described in respect of the first embodiment, but the mappings are stored in the address pool 405, rather than in the controller 401. As for the second and third embodiments, the devices $403_i$ do not have to communicate with the controller 401 at all once the initial address assignment has been established.

Fifth Embodiment

The fifth embodiment includes all of the features described in respect of the first embodiment, but the allocation of IPv4 addresses from the address pool 405 is managed by the controller 401, rather than by the devices $403_i$. In such a situation the first and second selection algorithms do not include reviewing IP address availability when identifying a device $403_i$. In this embodiment the address pool 405 could be stored on a Dynamic Host Configuration Protocol (DHCP) server, so that the controller 401 requests IPv4 addresses in accordance with DHCP. In this situation, (where allocation of IPv4 addresses is managed by the controller 401) then allocated addresses must be configured into the IPv4 interface of the identified device $403_i$. i.e. an address is chosen from the address pool 405, which is then given it to the identified device $403_i$.

This embodiment could be used in conjunction with either of the second, third or fourth embodiments.

Sixth Embodiment

The sixth embodiment can be used in conjunction with any of the above embodiments. This embodiment is concerned with resilience issues relating to the controller 401: in the event that the controller 401 is operationally inactive or the loading on the controller becomes unacceptably high, some kind of "back-up" system is required.

The sixth embodiment provides a second, or a mirror, controller, which monitors the operational status and loading on the controller 401 in accordance with predetermined criteria. In the event that the mirror controller detects that the controller 401 fails to satisfy one or more of the criteria, it either switches all control over to the mirror controller, which thereafter services the requests in the manner described above, or it balances control between the mirror controller and the controller 401. Preferably an alert is sent to the party operating the translator 400.

A cascaded arrangement of controllers 401$_i$ could be a preferred arrangement, in view of the fact that the number of requests is expected to scale with the introduction of IPv6 networks. As the controller 401 allocates sessions to the devices 403$_i$ dynamically, the translator 400 could include a plurality of active controllers without requiring any significant changes to the above-described embodiments. Furthermore, the DNS servers 104, 106 could be configured to forward requests to a next available controller in the event that a given controller fails (One of the features of a DNS server is that it can be configured to forward requests for certain domain names to more than one other DNS server. This feature could be employed in connection with the controllers, to achieve the above-described effect).

As disclosed in the document published by the IETF, referred to above, other migration methods include:
Automatic Tunnels
Configured Tunnels
Tunnel Broker
6over4
6to4
Dual stack transition mechanism (DSTM)
Stateless IP/ICMP Translation Algorithm (SIIT)
Bump-In-the-Stack" Technique (BIS)
SOCKS64

Some of these methods are naturally scalable—such as SIIT, because it is a stateless mechanism and BIS, because address translation takes place in a host. However, other methods, such as DSTM, suffer from scalability problems similar to those identified for NAT-PT. Embodiments of the invention could thus be integrated with features of the DSTM architecture in order to improve their scalability.

With DSTM, and as is known to those skilled in the art, a dual stack host tunnels IPv4 packets over an IPv6 network to a DSTM border router at the IPv4/IPv6 boundary, where the packets are subsequently un-encapsulated into IPv4 packets. The dual stack host is dynamically assigned an IPv4 address by a DHCP server (to be used as source address for any packets sent into the IPv4 network). In addition, the DHCP server tells the dual stack host of the IPv6 address of the border router (termed "tunnel endpoint"). Embodiments of the present invention could be integrated with the DSTM method so that the DHCP server assigns an IPv6 tunnel endpoint address (border router) according to the loading etc. on available border routers.

Thus, in terms of the elements of the embodiments presented above, the controller 401 would co-operate with the DHCP server and the devices 403$_i$ would be DSTM border routers.

What is claimed is:

1. Apparatus for providing communication between a network device in a first network and a network device in a second network, the first network operating in accordance with a first communication protocol and the second network operating in accordance with a second communication protocol, the apparatus comprising:
   (i) first means for assigning an alias to a target network device in said first network, the alias being compatible with the second communication protocol of said second network;
   (ii) second means for translating said assigned alias to an address for the target network device, said translated address being compatible with the first communication protocol of said first network, said second means comprising a plurality of further devices, said further devices having respective routing identifiers such that communications are routed individually to said further devices using said respective routing identifiers; and
   (iii) selecting means for selecting one of the plurality of further devices in accordance with predetermined criteria;
   wherein the first means and the second means are each separately addressable in said second network, and
   wherein said assigned alias corresponds to an address of the second means and includes a routing identifier of a selected one of the plurality of further devices of the second means, such that, when a network device in the second network sends one or more communication(s) using an address comprising the assigned alias, each of the one or more communication(s) is routed to the selected further device of the second means, wherein upon the selected further device of the second means translates the alias into the address of the target network device in the first network and sends the one or more communication(s) into the first network.

2. The apparatus according to claim 1, wherein the alias comprises a network address.

3. The apparatus according to claim 2, wherein the network address includes an identifier representative of the second means.

4. The apparatus according to claim 1, wherein the predetermined criteria includes device characteristics.

5. The apparatus according to claim 4, wherein the selecting means is operable to monitor device characteristics.

6. The apparatus according to claim 4, wherein the device characteristics for the selected one of the plurality of further devices include at least one of operational status of device, loading on device or alias available to the selected device.

7. The apparatus according to claim 1, including a store for storing mappings between the assigned alias and the target network device assigned to the alias.

8. The apparatus according to claim 7, wherein the store for storing mappings is managed by a database.

9. The apparatus according to claim 1, wherein the first means and second means are each separately addressable in both said first and second networks.

10. The apparatus according to claim 1, wherein the first communication protocol and the second communication protocol are different.

11. Apparatus for providing communication between a network device in a first network and a network device in a second network, the first network operating in accordance with a first communication protocol and the second network operating in accordance with a second communication protocol, the apparatus comprising:
   (i) first means for assigning an alias to a target network device in said first network, the alias being compatible with the second communication protocol of said second network;
   (ii) second means for translating said assigned alias to an address for the target network device, said translated address being compatible with the first communication protocol of said first network,
   wherein the first means and the second means are each separately addressable in said second network, and said assigned alias corresponds to an address of the second means, such that, when a network device in the second network sends one or more communication(s) using an address comprising the assigned alias, each of the one or more communications is routed to the second means, whereupon the second means translates the alias into the address of the target network device in the first network and sends the one or more communication(s) into the first network;

wherein the alias comprises a network address;

wherein the network address includes an identifier representative of the second means;

wherein the second means comprises a plurality of further devices configured to translate an alias into an address for communication(s) with one or more target network devices; and wherein each of the plurality of further devices has access to one or more groups of aliases used for assigning to the one or more target network devices.

12. The apparatus according to claim 11, wherein each of the one or more groups is stored in a store.

13. The apparatus according to claim 11, wherein two or more groups are stored in a store.

14. Apparatus for providing communication between a network device in a first network and a network device in a second network, the first network operating in accordance with a first communication protocol and the second network operating in accordance with a second communication protocol, the apparatus comprising:

(i) first means for assigning an alias to a target network device in said first network, the alias being compatible with the second communication protocol of said second network;

(ii) second means for translating said assigned alias to an address for the target network device, said translated address being compatible with the first communication protocol of said first network, wherein the first means and the second means are each separately addressable in said second network, and said assigned alias corresponds to an address of the second means, such that, when a network device in the second network sends one or more communication(s) using an address comprising the assigned alias, each of the one or more communication(s) is routed to the second means, whereupon the second means translates the alias into the address of the target network device in the first network and sends the one or more communication(s) into the first network;

wherein the alias comprises a network address;

wherein the network address includes an identifier representative of the second means;

wherein the second means comprises a plurality of further devices configured to translate an alias into an address for communication(s) with one or more target network devices;

wherein the apparatus includes selecting means for selecting one of the plurality of further devices in accordance with predetermined criteria; and wherein the selecting means is in operative association with the first means.

15. Apparatus for providing communication between a network device in a first network and a network device in a second network, the first network operating in accordance with a first communication protocol and the second network operating in accordance with a second communication protocol, the apparatus comprising:

(i) first means for assigning an alias to a target network device in said first network, the alias being compatible with the second communication protocol of said second network;

(ii) second means for translating said assigned alias to an address for the target network device, said translated address being compatible with the first communication protocol of said first network, wherein the first means and the second means are each separately addressable in said second network, and said assigned alias corresponds to an address of the second means, such that, when a network device in the second network sends one or more communication(s) using an address comprising the assigned alias, each of the one or more communications is routed to the second means, whereupon the second means translates the alias into the address of the target network device in the first network and sends the one or more communication(s) into the first network;

wherein the alias comprises a network address;

wherein the network address includes an identifier representative of the second means;

wherein the second means comprises a plurality of further devices configured to translate an alias into an address for communication(s) with one or more target network devices; and wherein the first means is operable to retrieve an alias available to at least one of said further devices, the retrieved alias being the assigned alias.

16. Apparatus for providing communication between a network device in a first network and a network device in a second network, the first network operating in accordance with a first communication protocol and the second network operating in accordance with a second communication protocol, the apparatus comprising:

(i) first means for assigning an alias to a target network device in said first network, the alias being compatible with the second communication protocol of said second network;

(ii) second means for translating said assigned alias to an address for the target network device, said translated address being compatible with the first communication protocol of said first network, wherein the first means and the second means are each separately addressable in said second network, and said assigned alias corresponds to an address of the second means, such that, when a network device in the second network sends one or more communication(s) using an address comprising the assigned alias, each of the one or more communication(s) is routed to the second means, whereupon the second means translates the alias into the address of the target network device in the first network and sends the one or more communication(s) into the first network;

wherein the alias comprises a network address;

wherein the network address includes an identifier representative of the second means;

wherein the second means comprises a plurality of further devices configured to translate an alias into an address for communication(s) with one or more target network devices;

wherein the apparatus includes a store for storing mappings between the assigned alias and the target network device assigned to the alias; and wherein the store for storing mappings is managed by the first means.

17. Apparatus for providing communication between a network device in a first network and a network device in a second network, the first network operating in accordance with a first communication protocol and the second network operating in accordance with a second communication protocol, the apparatus comprising:

(i) first means for assigning an alias to a target network device in said first network, the alias being compatible with the second communication protocol of said second network;

(ii) second means for translating said assigned alias to an address for the target network device, said translated address being compatible with the first communication protocol of said first network, wherein the first means and the second means are each separately addressable in said second network, and said assigned alias corresponds to an address of the second means, such that, when a network device in the second network sends one or more communication(s) using an address comprising the assigned alias, each of the one or more communication(s) is routed to the second means, whereupon the second means translates the alias into the address of the target network device in the first network and sends the one or more communication(s) into the first network;

wherein the alias comprises a network address;

wherein the network address includes an identifier representative of the second means;

wherein the second means comprises a plurality of further devices configured to translate an alias into an address for communication(s) with one or more target network devices;

wherein the apparatus includes a store for storing mappings between the assigned alias and the target network device assigned to the alias; and wherein the store for storing mappings is managed by one of said plurality of the further devices.

18. A method of providing communication between a network device in a first network and a network device in a second network, the first network operating in accordance with a first communication protocol and the second network operating in accordance with a second communication protocol, the method comprising:

assigning, by execution of a controller, an alias to a target network device in said first network, the alias being compatible with the second communication protocol of said second network, translating said assigned alias to an address for the target network device, said translated address being compatible with the first communication protocol of said first network, selecting one of a plurality of further devices in accordance with predetermined criteria, said further devices having respective routing identifiers such that communications are routed individually to said further devices using said respective routing identifiers, wherein the controller and at least the selected further device are each separately addressable in said second network;

wherein said assigned alias corresponds to the selected further device and includes a routing identifier of the selected one of the plurality of further devices, such that, when a network device in the second network sends one or more communication(s) using an address comprising the assigned alias, each of the one or more communication(s) is routed to the selected further device, whereupon the selected further device translates the alias into an address of the target network device in the first network and sends the one or more communication(s) into the first network.

19. The method according to claim 18, further including:

monitoring device characteristics of each said further device, and comparing monitored device characteristics with the said predetermined criteria so as to select said one of the plurality of further devices.

20. The method according to claim 18, wherein the controller and the selected further device are each separately addressable in both of said first and second networks.

21. The method according to claim 18, wherein the first communication protocol and the second communication protocol are different.

* * * * *